(12) United States Patent
Neale et al.

(10) Patent No.: US 12,420,930 B2
(45) Date of Patent: Sep. 23, 2025

(54) AIRCRAFT PASSENGER ACCOMMODATION UNIT

(71) Applicant: Safran Seats GB Limited, Cwmbran (GB)

(72) Inventors: Lee Neale, Cwmbran (GB); Clive Pearce, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 133 days.

(21) Appl. No.: 17/787,887

(22) PCT Filed: Dec. 31, 2020

(86) PCT No.: PCT/GB2020/053380
§ 371 (c)(1),
(2) Date: Jun. 21, 2022

(87) PCT Pub. No.: WO2021/136935
PCT Pub. Date: Jul. 8, 2021

(65) Prior Publication Data
US 2023/0018064 A1  Jan. 19, 2023

(30) Foreign Application Priority Data
Jan. 3, 2020 (GB) .................................... 2000044

(51) Int. Cl.
*B64D 11/06* (2006.01)
*B64D 11/00* (2006.01)

(52) U.S. Cl.
CPC ...... *B64D 11/0606* (2014.12); *B64D 11/0602* (2014.12); *B64D 2011/0046* (2013.01)

(58) Field of Classification Search
CPC ...... B64D 11/0606; B64D 11/06; B64D 11/00
See application file for complete search history.

(56) References Cited

U.S. PATENT DOCUMENTS

2018/0281963 A1  10/2018  Dowty et al.
2019/0100912 A1*  4/2019  Lehtonen .............. E05B 65/087
(Continued)

FOREIGN PATENT DOCUMENTS

GB          2548901 A      10/2017
WO       2018033599 A1     2/2018
WO    WO-2018093825 A1 *   5/2018  ............. B60N 2/005

OTHER PUBLICATIONS

International Patent Application No. PCT/GB2020/053380, International Search Report and Written Opinion, dated Apr. 7, 2021.

(Continued)

*Primary Examiner* — Kimberly S Berona
*Assistant Examiner* — Nevena Aleksic
(74) *Attorney, Agent, or Firm* — Kilpatrick Townsend & Stockton LLE (57) ABSTRACT

The invention provides an aircraft passenger accommodation unit comprising a seat, a shell defining an opening, and a door. The door is translatable along a first path across the opening between a closed position in which passenger egress through the opening is at least partially blocked, and an open position which allows passenger access between a seat and an aisle. The door is translatable in a second direction that is transverse to the first direction, between a first configuration and a second configuration. In the first configuration, the door is translatable across the opening along the first path, and when the door is in the second configuration, the door is translatable across the opening along a second path. The invention also provides a door arrangement and a method of using a door.

14 Claims, 10 Drawing Sheets

(56) References Cited

U.S. PATENT DOCUMENTS

2019/0210733 A1 7/2019 Herault et al.
2019/0329891 A1 10/2019 Bonnefoy et al.

OTHER PUBLICATIONS

United Kingdom Patent Application No. 2000044.4, Search Report, dated Sep. 29, 2020.

* cited by examiner

AIRCRAFT PASSENGER ACCOMMODATION UNIT

CROSS REFERENCE TO RELATED APPLICATIONS

This application is a national phase application of International Patent Application PCT/GB2020/053380, filed on Dec. 31, 2020 and titled "Aircraft Passenger Accommodation Unit," which is related to and claims priority to United Kingdom Patent Application No. 2000044.4, filed on Jan. 3, 2020, both of which are hereby incorporated by reference in their entireties.

BACKGROUND OF THE INVENTION

The present disclosure relates to an aircraft passenger accommodation unit for location in an aircraft cabin. The disclosure also provides a door arrangement for an aircraft passenger accommodation unit, and a method of using a door of an aircraft passenger accommodation unit.

Business class and first class seating generally aims to provide aircraft passengers with as much privacy as possible. However, safety restrictions require that passengers are visible to cabin crew in some circumstances, and require that passengers can easily access the aisle in event of emergency.

Privacy doors and windows for aircraft passenger accommodation units are known. WO2018/033599A1, US2018/281963A1 and GB2548901A all disclose examples of doors of aircraft passenger accommodation units, which improve a seat occupant's privacy.

Often, privacy doors slide or pivot between open and closed configurations, thus enabling variable levels of passenger privacy and/or variable access between the passenger seat and the aisle. Pivotable doors may pivot outwardly into an aisle, causing an obstruction. It is desirable to maximise available space in the aircraft cabin and it is important to avoid obstructing the aisle, to allow other passengers and cabin crew to safely move about the plane.

Often, privacy doors generally use a pivoting or sliding mechanism to move between open and closed configurations. If this mechanism were to fail, passenger access to the aisle may be blocked, which is undesirable.

The present invention seeks to mitigate the above-mentioned problems. Alternatively, or additionally, the present invention seeks to provide an improved aircraft passenger accommodation unit.

SUMMARY OF THE INVENTION

The present invention provides, according to a first aspect, an aircraft passenger accommodation unit for location in an aircraft cabin adjacent to an aisle. The aircraft passenger accommodation unit comprises a seat, and a shell at least partially surrounding the seat, wherein the shell defines an opening that allows a passenger to egress between the aisle and the seat. The aircraft passenger accommodation unit comprises a door for providing variable access through the opening between the aisle and the seat. The door is translatable along a first path in a first direction across the opening between a closed position in which passenger access through the opening is at least partially blocked, and an open position which allows passenger access between the seat and the aisle through the opening. The door is translatable in a second direction that is transverse to the first direction, between a first configuration and a second configuration. When the door is in the first configuration, the door is translatable across the opening along the first path. When the door is in the second configuration, the door is translatable across the opening along the second path.

When the aircraft passenger accommodation unit is in its normal orientation, such that a passenger may sit in the seat and the seat is in a conventional orientation, the first path may be a substantially horizontal path, such that the door may be translated substantially horizontally between a closed position and an open position. The first path may be above the second path.

When the door is in the first configuration the door may be located at a first height relative to the seat. When the door is in the first configuration, a top edge of the door may be level with a top edge of the shell. When the door is in the second configuration, the door may be located at a lower height than the first configuration. When the door is in the second configuration, the top edge of the door may sit below the top edge of the shell. The door may therefore translate downwards from the first configuration to the second configuration along a second direction. The second direction may be substantially vertical.

The door may be translatable along the second path across the opening between a closed position in which passenger egress between the aisle and the seat is at least partially blocked, and an open position which allows passenger access between the seat and the aisle through the opening The first path may be substantially parallel to the second path. The first and second paths may be substantially horizontal paths such that the door may be translated substantially horizontally across the opening in both the first and second configurations.

The aircraft passenger accommodation unit may further comprise a first support mechanism. The first support mechanism may be arranged to support the door in the first configuration. The support mechanism may comprise a cap provided along a top edge of the shell. When the door is in the first configuration, an upper edge of the door may slot into a cap provided along the top edge of the shell. The support mechanism may be provided on an outside wall of the shell.

The first support mechanism may comprise a first guide mechanism arranged to guide translation of the door as the door is translated along the first path. The guide mechanism may run substantially parallel to the first path. The guide mechanism may limit wobbling or deflection of the door as the door is translated along the first path. This may enable the door to remain flush with the outside wall of the shell as the door is translated along the first path.

The first support mechanism may comprise a first guide track arranged to guide the translation of the door as the door is translated along the first path.

The first guide track may be provided on the shell. The first guide track may be provided on an outer wall of the shell, and may run substantially parallel to a top edge of the shell. The first guide track may support the door on an outer wall of the shell, such that the door slides along the outer wall of the shell as it translates along the first path in the first configuration.

The first support mechanism may comprise a release mechanism. The release mechanism may be moveable between a retaining position, in which the door may be retainable in the first configuration, and a released position, in which the door is released from the first configuration. The release mechanism may comprise a bolt or a latch. A bolt pin may be provided on an outer wall of the shell, and may be located in a hole provided on the door. The hole may be provided on an upper edge of the door. In the retaining position, the bolt may be located in the hole, thereby holding the door in the first configuration. In the released position, the bolt may be located in the hole. Alternatively, the release mechanism may comprise a latch provided on the shell. In the retaining position, the latch may secure the door in the first configuration. The release mechanism may be biased to the retaining position, for example, using a spring.

When the release mechanism is in the released position, the door may be translatable from the first configuration to the second configuration. When the release mechanism is in the released position, the door may drop under gravity from the first configuration to the second configuration.

The aircraft passenger accommodation unit may comprise a release handle. Actuation of the release handle is operable to cause the release mechanism to move from the retaining position to the released mechanism. The release handle may comprise a lever or a button. The release handle may protrude from the shell and may be accessible from the inside of the shell, such that the handle can be actuated by a passenger occupying the seat.

The release handle may be connected to the release mechanism by a release cable. The release cable may be located within the door. Actuating the release handle, for example by pulling on the lever or pushing a button, may release the release mechanism, by pulling the bolt out of the hole, or releasing the door from the latch, for example.

The shell may comprise a second support mechanism. The second support mechanism may be arranged to support the door in the second configuration. The support mechanism may be provided on an outside wall of the shell. When the aircraft passenger accommodation unit is in its normal orientation, the second support mechanism may be provided below the first support mechanism. When the door is in the second configuration, a lower edge of the door may supported by the support mechanism. When the door is in the first configuration, the lower edge of the door may be suspended above the second support mechanism, and may not be in contact with the support mechanism.

The second support mechanism may comprise a second guide mechanism to guide translation of the door as the door is translated along the second path. The second guide mechanism may run substantially parallel to the third path. The second guide mechanism may run substantially parallel to the first path and the first guide mechanism. The guide mechanism may limit wobbling or deflection of the door as the door is translated along the third path. This may enable the door to remain flush with the outside wall of the shell as the door is translated along the third path.

The second support mechanism may comprise a second guide track arranged to guide translation of the door as the door is translated along the second path.

The second guide track may be provided on the shell. The second guide track may be provided on an outer surface of the shell. The second guide track may run substantially parallel to a first support track. The second guide track may run below a first guide track when the shell is in use in its normal orientation. The spacing of first and second guide tracks may be such that when the door is in the first configuration, the a top edge of the door is supported by a first guide track and sits above a second guide track, and when the door is in the second configuration, a bottom edge of the door is supported by the second guide track. The second guide track may therefore be provided at or near the bottom edge of the door, such that if the door moves from the first configuration into the second configuration the bottom edge of the door may drop onto the second guide track. The second guide track may support the door as it translates along the third path in the second configuration.

According to a second aspect, the present invention provides a door arrangement for an aircraft passenger accommodation unit, the door arrangement being for providing variable access through an opening of the aircraft passenger accommodation unit. The door arrangement comprises a panel, and a door translatable with respect to the panel along a first path in a first direction across the opening between a closed position in which passenger egress between and an aisle and a seat is partially blocked, and an open position, which allows passenger access between the aisle and the seat through the opening. The door is translatable in a second direction that is transverse to the first direction between a first configuration and a second configuration. When the door is in the first configuration, the door is translatable across the opening along the first path. When the door is in the second configuration, the door is translatable across the opening along a second path.

According to a third aspect, the present invention provides a method of using a door arrangement of an aircraft passenger accommodation unit. The method comprises the step of using the aircraft passenger accommodation unit or door arrangement of any preceding claim. In normal use, a passenger occupying a seat of the aircraft passenger accommodation unit may translate the door between closed and open positions in the first configuration along a the first path, thereby varying access between the aisle and the inside of the aircraft passenger accommodation unit. A first guide track may provide a first opening/closing mechanism. In order to comply with aircraft safety regulations, it is necessary that the passenger is provided with an alternative method of accessing the aisle. In the event that the first opening/closing mechanism fails, for example, if the first guide track is damaged or blocked, a passenger may release a release mechanism. The door may then translate into the second configuration. In the second configuration, the door is translatable along a second path, guided by a lower guide track. This provides an alternative, second opening mechanism for the door.

According to a fourth aspect, the present invention provides a method of using a door of an aircraft passenger accommodation unit to provide variable access through an opening between an aisle and a seat. The method comprises a step of translating the door along a first path in a first direction across the opening. The method comprises a step of translating the door in a second direction transverse to the first direction, from a first configuration to a second configuration. The method comprises a step of translating the door in the second configuration, across the opening, along a second path.

The method may further comprise the step of translating the door transverse to the first direction from the second configuration to the first configuration. Following actuation of the release mechanism, whilst the door is in the second configuration, a user may wish to move the door back to the first configuration. The door may be translated from the second configuration to the first configuration whilst the door is in the open position, or whilst the door is in a closed or partially closed position.

The method may comprise, prior to the step of translating the door transverse to the first direction from the second configuration to the first configuration, moving a release mechanism from the retaining position to the released position. The release mechanism may be biased, for example spring biased, into the retaining position. When the door is in the second configuration, the release mechanism may be in the retaining position. In order to re-set the door into the first configuration, the release mechanism may be moved against a biasing force into the released position. This moving of the release mechanism may result from the door being moved against the biasing force. This may allow the door to be translated from the second configuration to the first configuration. Once the door is in the first configuration, the release mechanism may be moved into the retaining position, to support the door in the first configuration.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
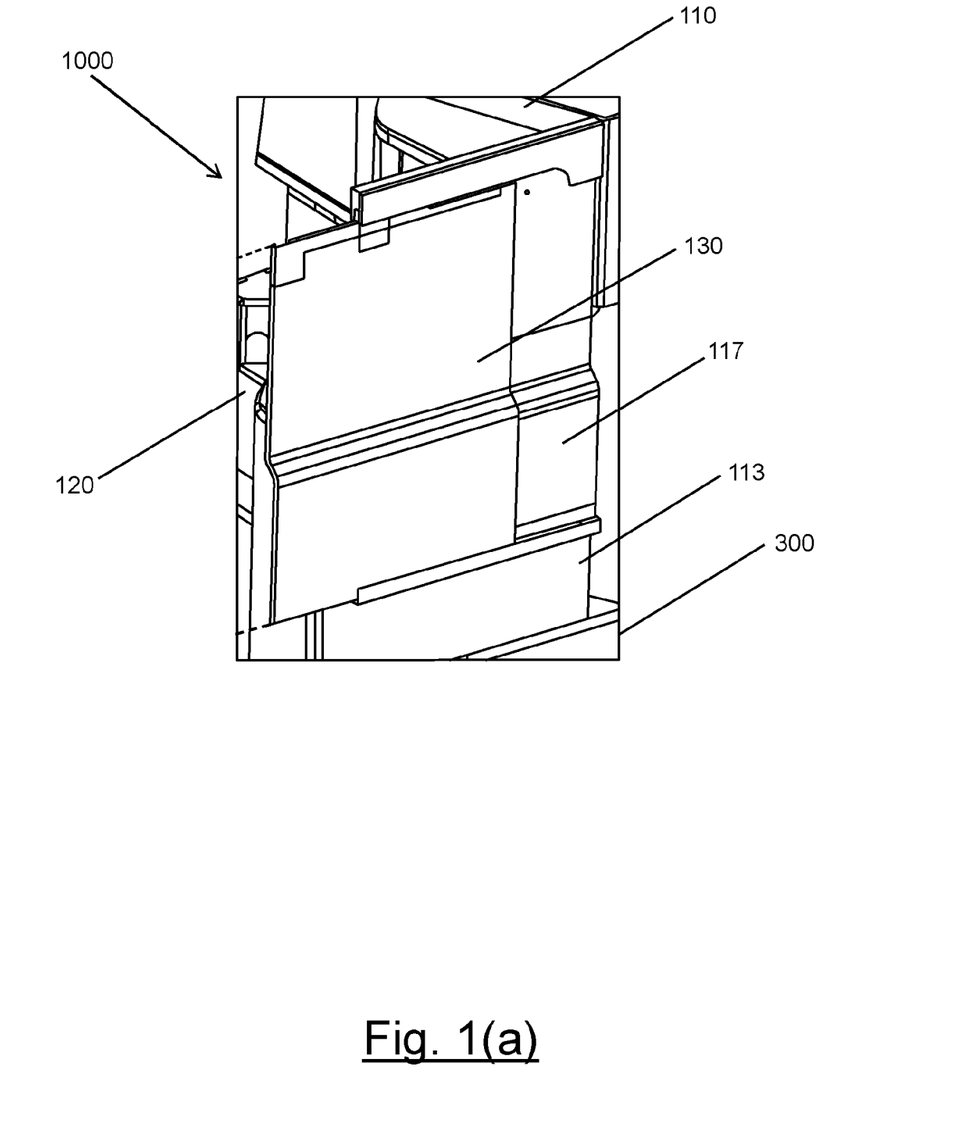
FIG. 1(a) is a perspective view of a door and a portion of a shell of an aircraft passenger accommodation unit situated adjacent to an aisle of an aircraft, according to a first embodiment of the invention.
Figure 1B:
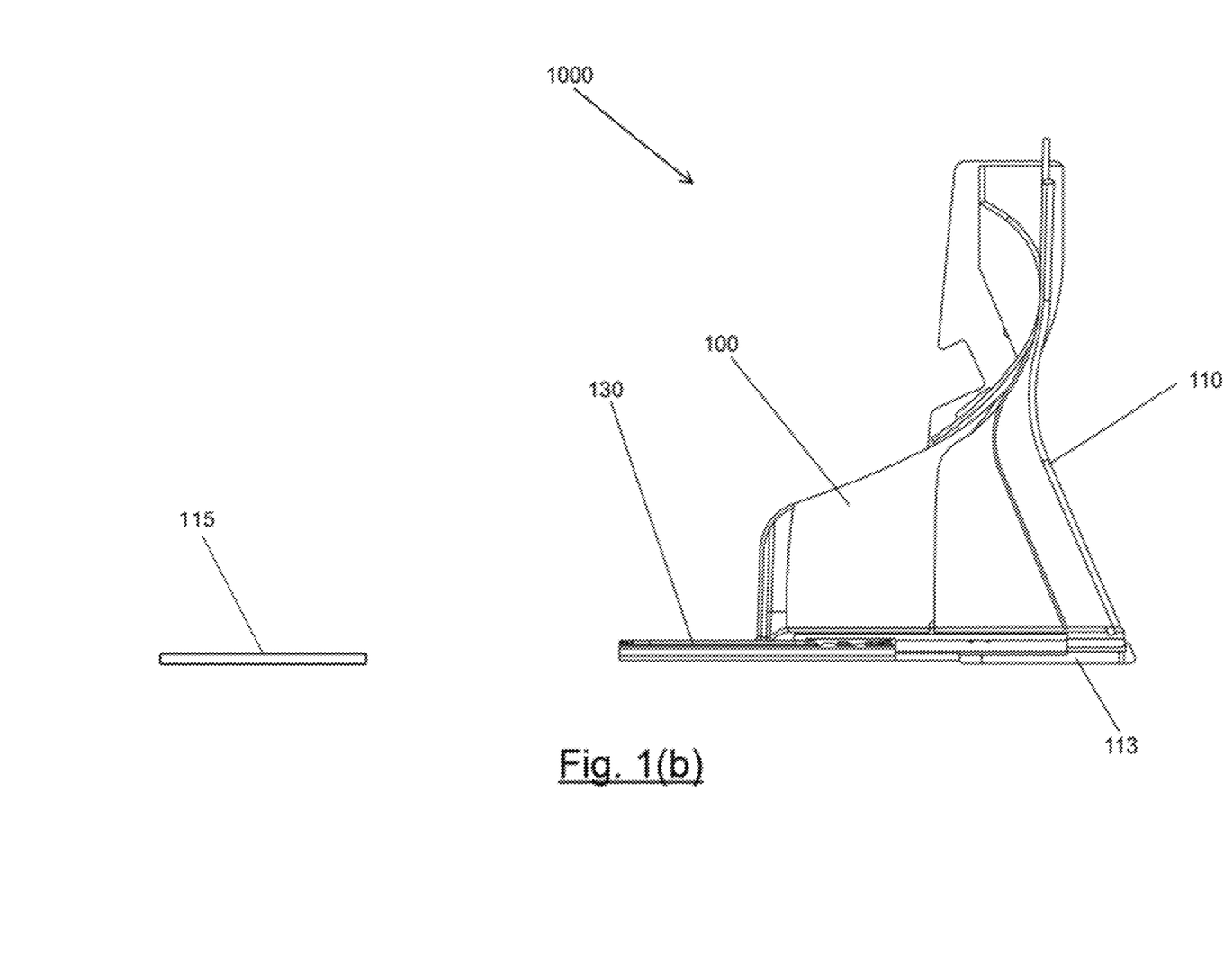
FIG. 1(b) is a plan view of a portion of the aircraft passenger accommodation unit of FIG. 1(a)

FIGS. 1(a) and 1(b) show a perspective view of part of an aircraft passenger accommodation unit 1000 according to a first embodiment of the invention. The aircraft passenger accommodation unit 1000 is situated adjacent to an aisle 300 of an aircraft. The aircraft passenger accommodation unit 1000 comprises a shell 110 that partially surrounds a seat and a console 100 (console shown in FIG. 1(b)). The shell 110 comprises a first wall 113 adjacent to the aisle 300 that lies alongside the console 100. A second wall 115 also lies adjacent to the aisle 300. The first wall 113 and second wall 115 define an opening 120 (indicated by dashed lines in FIG. 1(a)).

The aircraft passenger accommodation unit 1000 comprises a door 130. In FIGS. 1(a) and 1(b) the door 130 extends across the opening 120 in a partially extended position, in which passenger access through the opening 120 is partially blocked. When the door 130 is in a fully retracted position, the whole door 130 lies adjacent the outer surface 117 of the first wall 113 of the shell 110. When the door 130 is in the retracted position, a passenger can move freely between the aisle 300 and the inside of the unit 1000.

The door 130 is translatable along a first path in a first direction across the opening 120, and the door 130 is translatable between a raised configuration and a dropped configuration, as described in FIGS. 2(a) to 2(d).

Figure 2A:
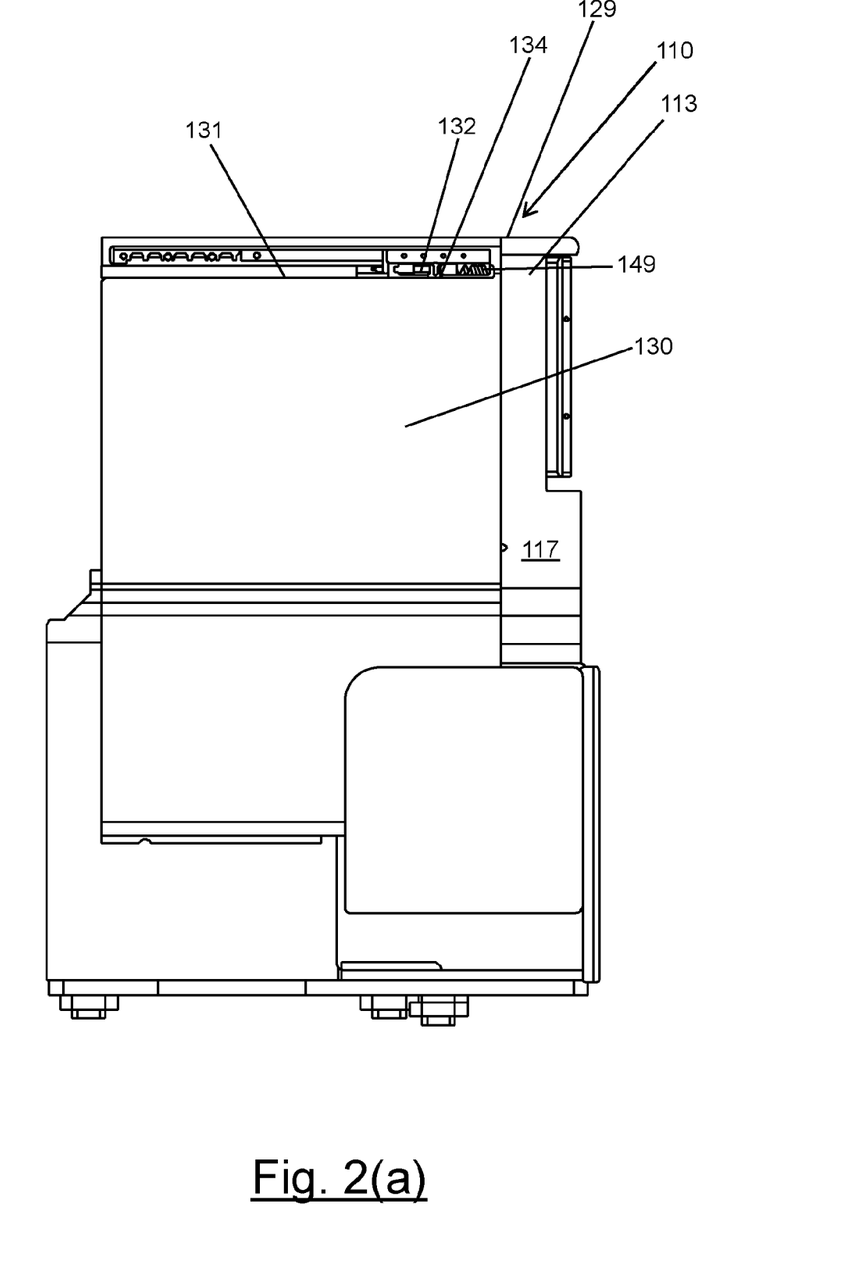
FIG. 2(a) is a front view of the door and a portion of the shell of the aircraft passenger accommodation unit of FIGS. 1(a) and 1(b) showing the door in the open position and in the first configuration.

In FIG. 2(a), the door 130 is in a retracted position. The door 130 lies against the outer surface 117 of the first wall 113 of the shell 110. The door 130 is in the raised configuration. The top edge 131 of the door 130 is slightly below the top edge 129 of the first wall 113 of the shell 110, and runs parallel to the top edge 129 of the first wall 113. A drop bolt 132 is provided on the outer surface 117 of the first wall 113 of the shell 110. The drop bolt 132 supports a bolt guide 134. The drop bolt guide 134 is provided on the top edge 131 of the door 130. When the drop bolt 132 is in the retaining position (as shown in FIG. 2(a)), the drop bolt guide 134 and the door 130 are held in the raised configuration by the drop bolt 132. The drop bolt 132 is biased towards the retaining position by a spring 149.

Figure 2B:
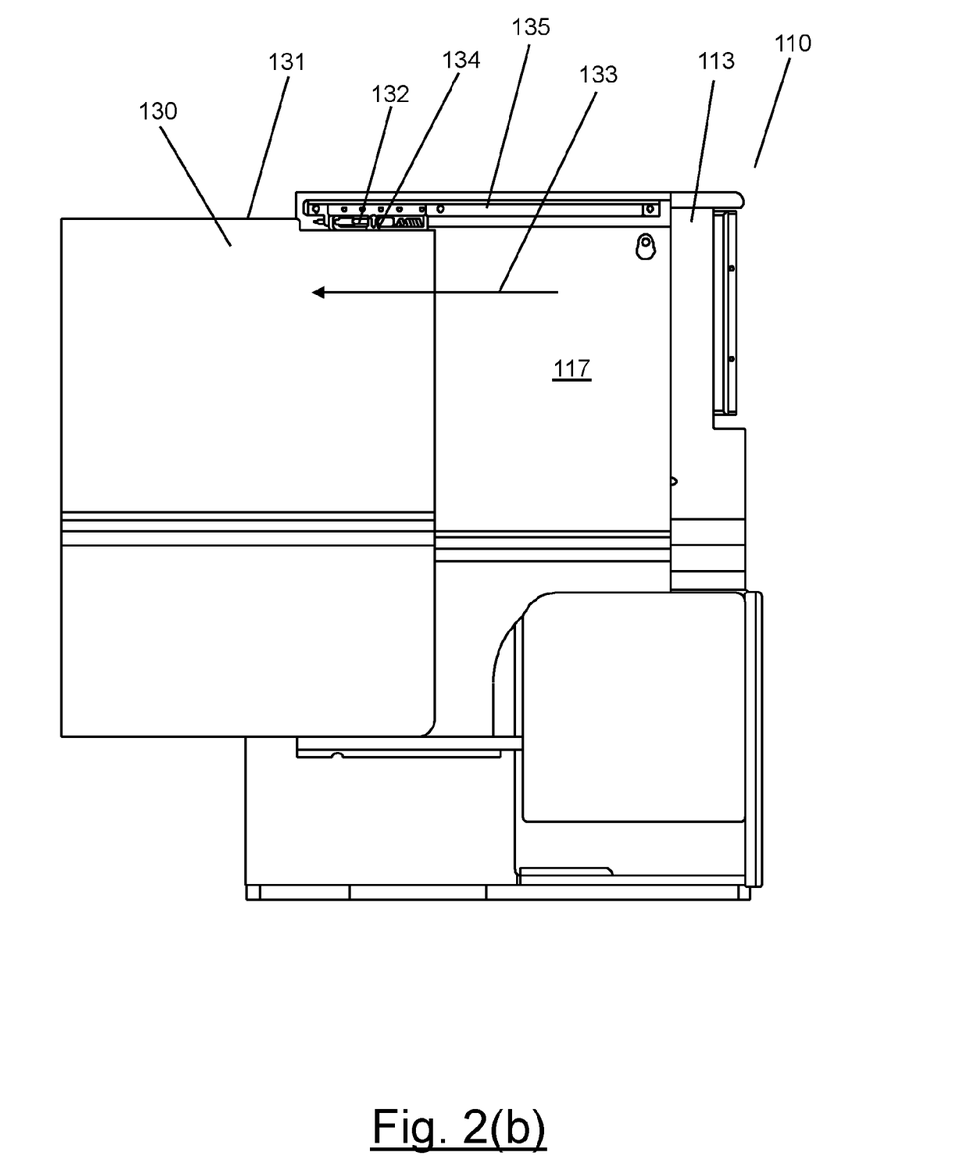
FIG. 2(b) is a front view of the door and a portion of the shell of FIGS. 1(a) to 2(b) showing the door in the closed position and in the first configuration.

In FIG. 2(b), the door 130 has been translated along a first path (indicated by arrow 133) in the raised configuration, from a retracted position to an extended position. The translation of the door 130 is guided by an upper guide track 135 which runs parallel to the first path. The upper guide track 135 is provided on the outer surface 117 of the first wall 113 of the shell 110, and is arranged to guide the door 130 as the door 130 translates along the first path 133. As the door 130 translates along the first path (indicated by arrow 133 in FIG. 2(b)) in the raised configuration, the drop bolt 132, which is connected to the upper guide track 135, supports the drop bolt guide 134, and translates with the drop bolt guide 134, supported by the upper guide track 135.

When the door 130 is in normal use, a passenger may translate the door 130 between the retracted configuration of FIG. 2(a) and the extended configuration of FIG. 2(b). This provides variable access between the aisle 300 and the inside of the aircraft passenger accommodation unit 1000, and gives a passenger privacy, whist allowing access when required. As the door 130 is translated between the retracted position and the extended position in the raised configuration, the drop bolt 132 runs along the drop bolt guide 134.

Figure 2C:
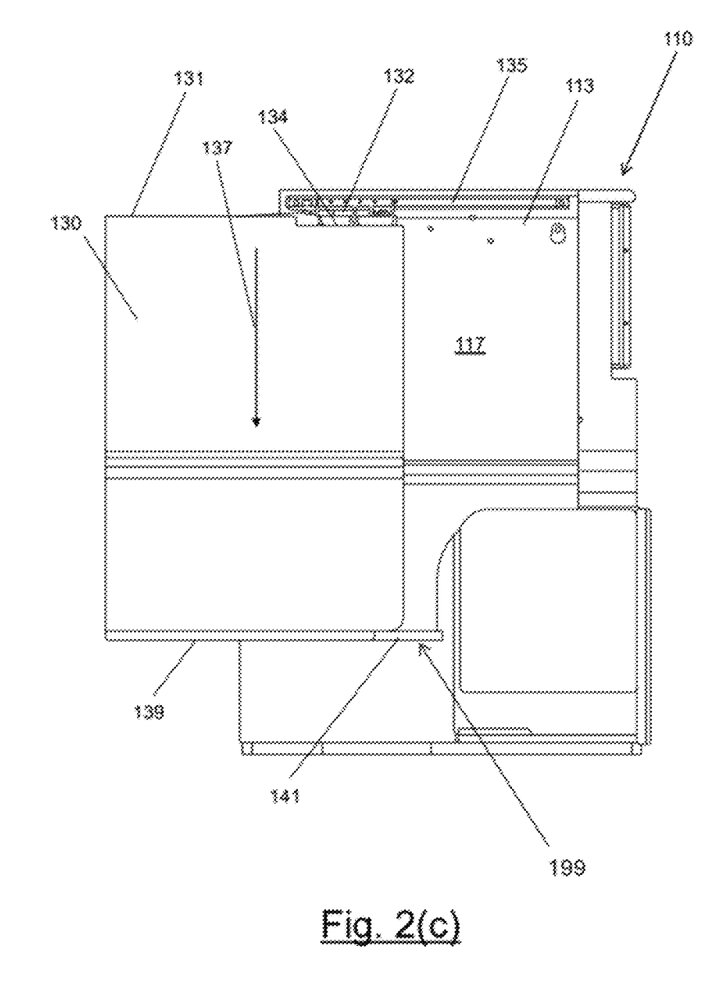
FIG. 2(c) is a front view of the door and a portion of the shell of FIGS. 1(a) to 2(b), showing the door in the closed position and in the second configuration.

In FIG. 2(c) the door 130 is in a partially extended configuration, such that passenger access between the aisle 300 and the inside of the passenger aircraft accommodation unit 1000 is partially blocked. In FIG. 2(c), an emergency release has been activated, and the drop bolt 132 has been moved from the retaining position to a released position. The drop bolt guide 134, which is provided on the upper edge 131 of the door 130 has dropped vertically, and the door 130 has dropped in a second direction (indicated by the arrow 137 in FIG. 2(c), into the dropped configuration. In the second configuration, the bottom edge 139 of the door 130 is supported by a lower guide mechanism 199 comprising a lower guide track 141 which is positioned towards the bottom of the door 130.

In the dropped configuration, the door 130 is translatable along a second path, which runs parallel to the lower guide track 141. The lower guide track 141 runs parallel to the upper guide track 135, and enables the door 130 to be translated across the opening 120 between an extended position and a retracted position. During translation in the second configuration, the bottom edge 139 of the door 130 is guided by the lower guide track 141. The lower guide track 141 therefore provides an alternative mechanism for the door 130 to be translated between extended and retracted positions. In the event that translation along the first path, with the door 130 in the raised configuration fails, for example, if the first guide track 135 becomes blocked or damaged, a passenger can activate the emergency release, which moves the drop bolt 132 from the retaining position to the released position. The door 130 then drops vertically onto the lower guide track 141, and can be translated along a second path using the lower guide track 141. The door can therefore be opened using an alternative mechanism in the event that the primary opening mechanism becomes damaged.

Figure 2D:
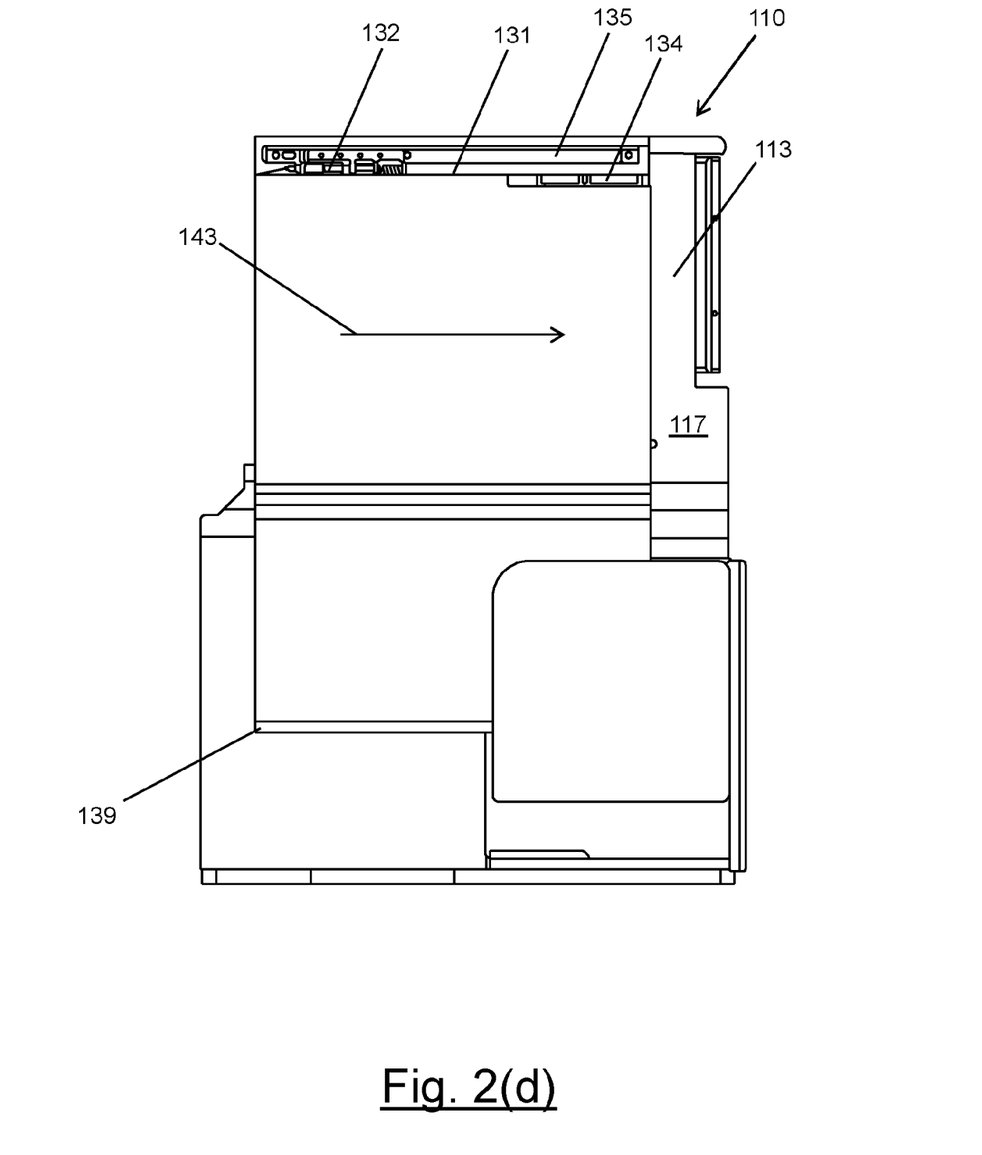
FIG. 2(d) is a front view of the door and a portion of the shell of FIGS. 1(a) to 2(c), showing the door in the open position and in the second configuration.

In FIG. 2(d), the door 130 is in the dropped configuration, and has been translated along the second path (indicated by arrow 143), guided by the lower guide track 141 (not visible in FIG. 2(d)), from an extended position to the retracted position. The door 130 is therefore fully open, allowing passenger access between the aisle 300 and the inside of the aircraft passenger accommodation unit 1000.

Figure 3A:
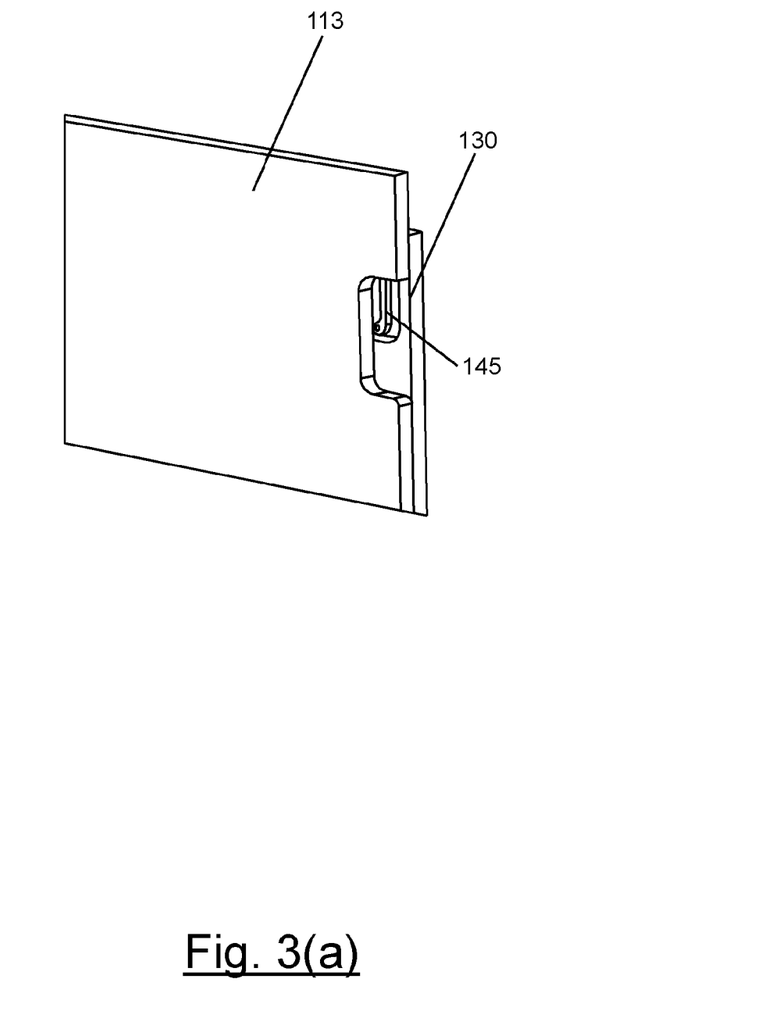
FIG. 3(a) is a perspective view of a portion of the shell and the door of FIGS. 1(a) to 2(d) showing a release handle and showing the door in the open position.
Figure 3B:
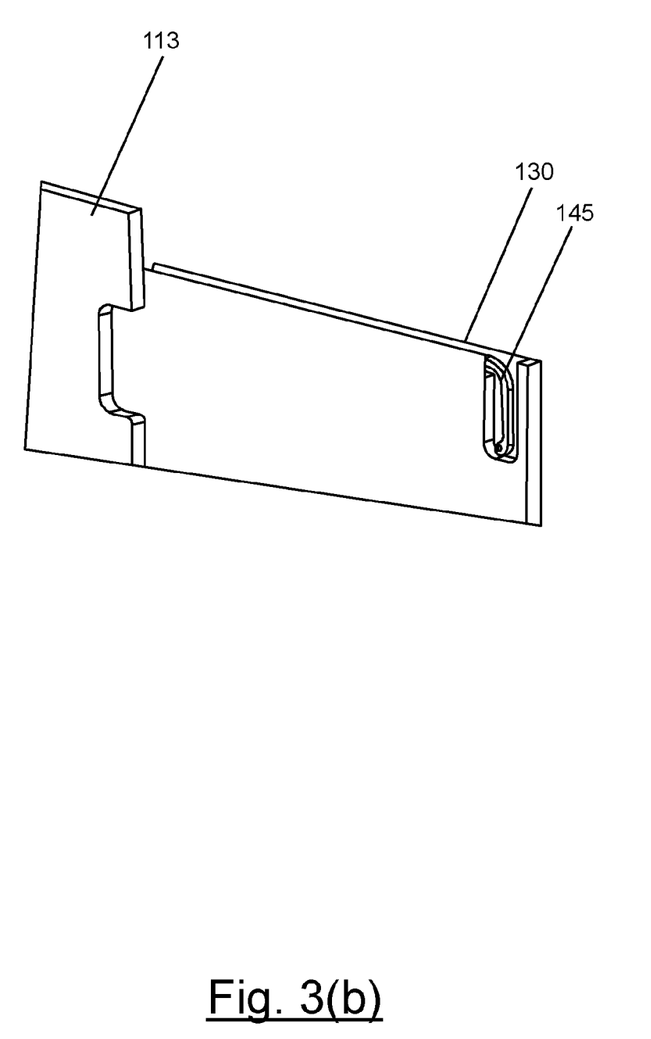
FIG. 3(b) is a perspective view of a portion of the shell and the door of FIGS. 1(a) to 3(a) showing a release handle and showing the door in a closed position.

The drop bolt 132 shown in FIGS. 2(a) to 2(d) is moved from the retaining position to the released position using a release handle 145, provided on the door 130 as shown in FIGS. 3(a) and 3(b). As shown in FIG. 3(b) the release handle 145 protrudes from the door 130 and can be accessed by the user. In FIG. 3(a), the door is in a fully retracted position, and the release handle 145 protrudes from the door 130 so that it can be accessed by a passenger occupying a seat 100 inside the aircraft passenger accommodation unit 1000.

Figure 4A:
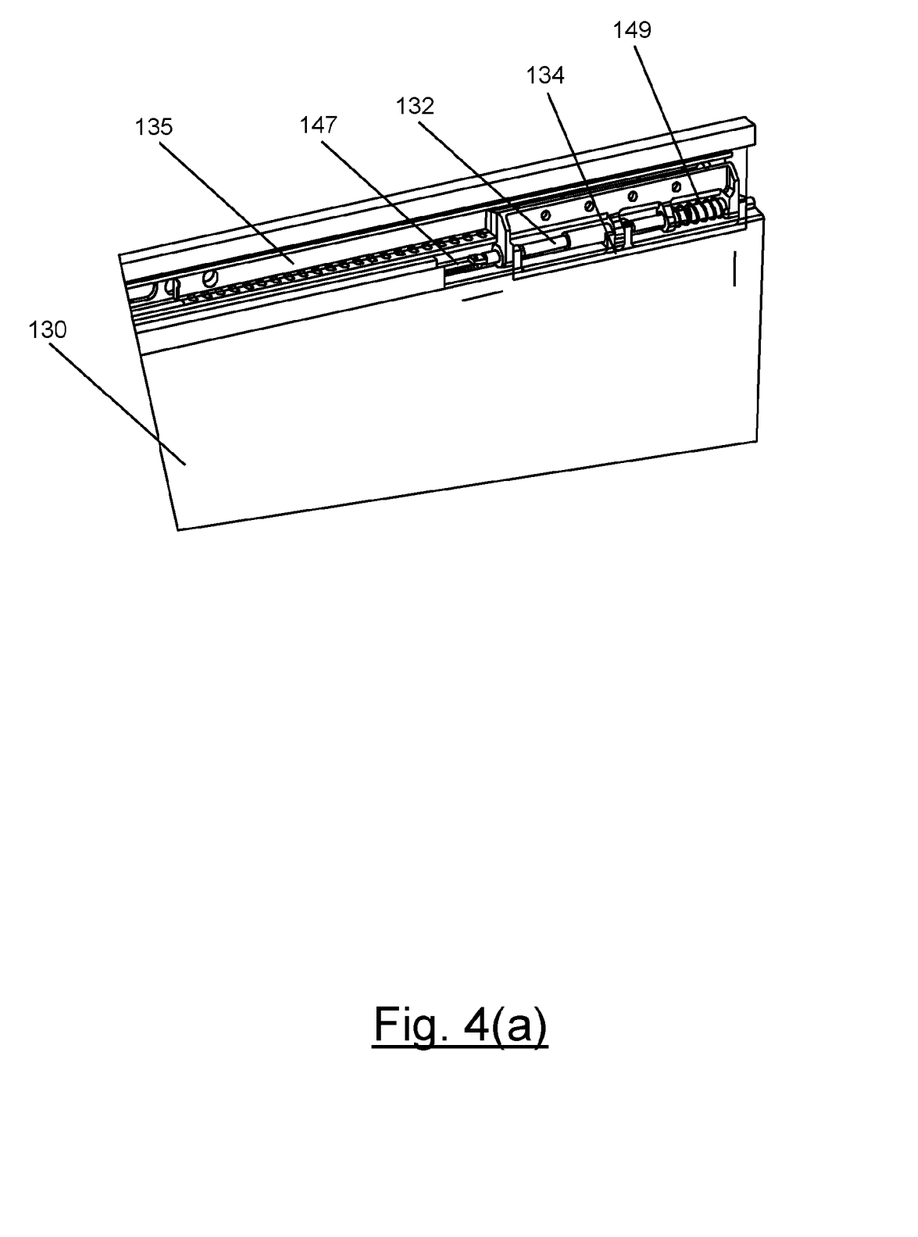
FIG. 4(a) is a perspective view of a portion of the door and the shell of FIGS. 1(a) to 3(b), showing the door in an open position and showing a drop bolt in a retaining position.

The release handle 145 is connected to the drop bolt 132 by a cable 147, as shown in FIG. 4(a). Hence, when the release handle 145 is actuated, it pulls on the cable which then moves the drop bolt 132 from the retaining position to the released position. The drop bolt 132 is released from the drop bolt guide 134, and the door 130 drops from the raised configuration to the lower configuration under gravity.

The release handle 145 can be actuated by a user when the door 130 is in the raised configuration, and when the door 130 is at any position along the first path. FIG. 3(a) shows the door in the fully retracted position, whereas in FIG. 3(b) the door 130 is in an extended position.

Figure 4B:
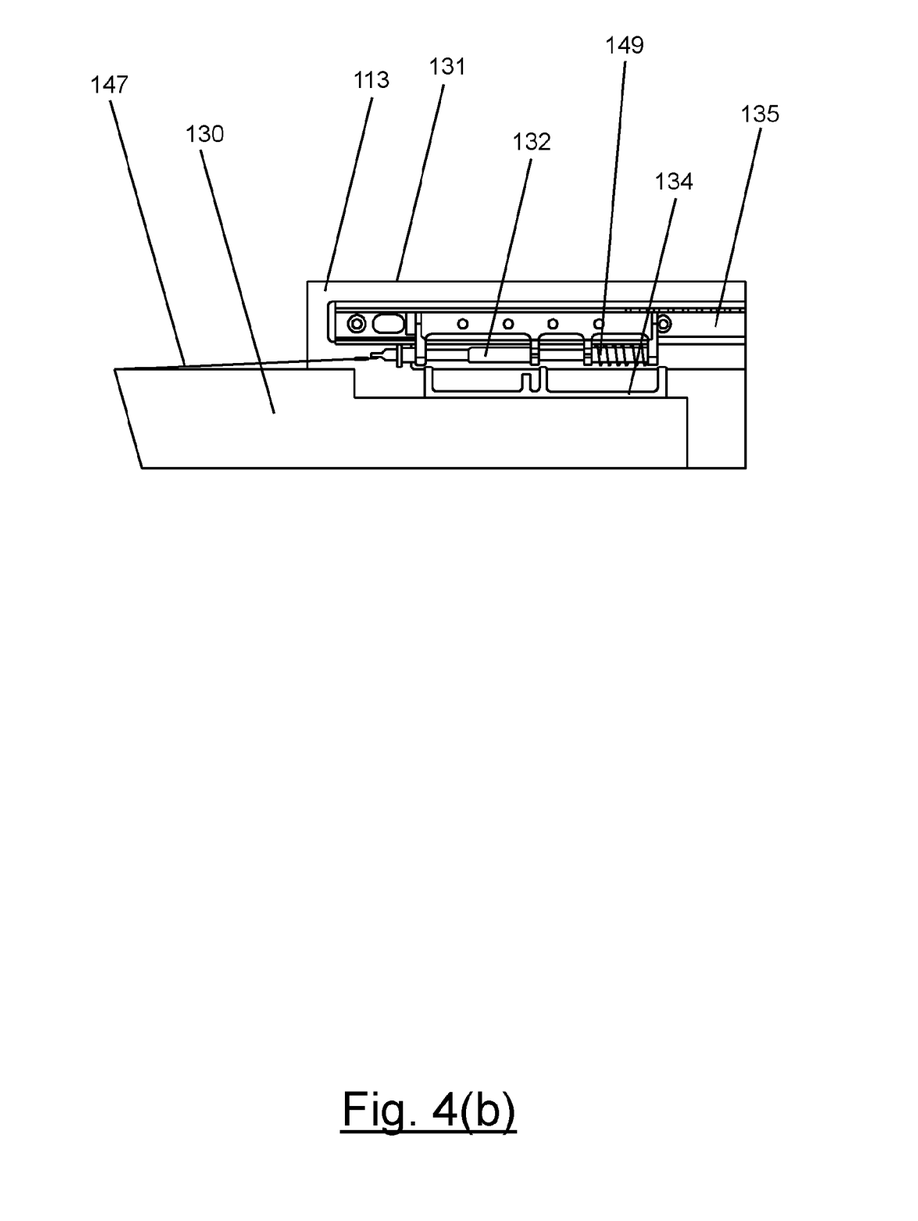
FIG. 4(b) is a perspective view of a portion of the door and the shell of FIGS. 1(a) to 4(a), showing the door in a closed position and showing a drop bolt in a released position.

FIG. 4(a) shows the drop bolt 132 in the retaining position, as it would be when the door 130 is in the raised configuration (i.e. the configurations shown in FIGS. 2(a) and 2(b)). If the release handle is actuated 145, the release cable 147 pulls the drop bolt 142 against the spring bias 149, and the drop bolt 132 is released from the drop bolt guide 134. The door 130 and the drop bolt guide 134 drop under gravity into the dropped configuration, as shown in FIG. 4(b). In the dropped configuration, the lower edge 139 of the door 130 is supported by the lower guide track 141 (as shown in FIGS. 2c and 2d), and the door 130 can translate along a second path (indicated by arrow 143 in FIG. 2(d)) between the extended and retracted positions across the opening 120, guided by the lower guide track 141.

Actuating the release handle 145 therefore drops the door 130 from the raised configuration to the dropped configuration. The door 130 moves from a raised position in which it is supported by the upper guide track 135 and translates along a first path, to a dropped position in which it is supported by the lower guide track 141 and translates along the second path. The door 130 can be moved between retracted and extended positions along either the first and the second path. Actuating the release mechanism therefore enables an alternative opening mechanism to be used to open the door 130.

In use, if the upper guide track becomes damaged, gets blocked, the door 130 may no longer be translatable along the first path. Using the release handle 145, a user can actuate the drop bolt 132 to drop the door 130 onto the lower guide track 141, such that the door 130 can be translated along the second path.

In order to reset the door 130 into the first configuration, the door 130 can be manually lifted from the dropped configuration to the raised configuration. The release handle 145 is actuated as the door 130 is lifted, moving the drop bolt 132 into the released position, such that the door can be raised into the first configuration. Once the door 130 is in the raised position, the release handle 145 can be released and the spring 149 will cause the drop bolt 132 to move back into the retaining position, thereby supporting the drop bolt guide 134.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In some embodiments, a latch, rather than a drop bolt, is actuated to move the door from the raised position to the dropped position. The latch may comprise a pair of jaws, which may biased towards a closed position. When the jaws are in the closed position, the jaws may grip an upper edge of the door.

In some embodiments, the door can lifted from the dropped configuration into the raised configuration (for example, to reset the door after emergency release). As the door is lifted into the first configuration, the door may move against the bias spring of the release mechanism.

In some embodiments, the second path may be different to the first path. When the aircraft passenger accommodation unit is in its normal orientation, the second path may be angled with respect to the horizontal, for example at angle of 5 degrees with respect to the horizontal.

In the embodiments, the shell is generally rectangular, however in other embodiments the shell may be square, oval or any other suitable shape.

Similarly, in the embodiments described above, the door is generally rectangular. In other embodiments the door can be any suitable shape that can span an opening defined by the shell.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft passenger accommodation unit for location in an aircraft cabin adjacent to an aisle, the unit comprising:
(i) a seat;
ii) a shell, at least partially surrounding the seat, wherein the shell defines an opening that allows a passenger to egress between the aisle and the seat;
(iii) a door for providing variable access through the opening between the aisle and the seat, wherein the door is translatable along a first path in a first direction across the opening between a closed position in which passenger access through the opening is at least partially blocked, and an open position which allows passenger access between the seat and the aisle through the opening,
wherein the door is translatable in a second direction that is transverse to the first direction, between a first, raised, configuration and a second, dropped, configuration,
wherein, when the door is in the first configuration, the door is translatable across the opening along the first path, and,
wherein, when the door is in the second configuration, the door is translatable across the opening along a second path, wherein the first path and the second path are discrete paths;
(iv) a first support mechanism, wherein the first support mechanism is arranged to support the door in the first configuration, wherein the first support mechanism comprises a first guide mechanism arranged to guide translation of the door along the first path; and
(v) a second support mechanism, wherein the second support mechanism is arranged to support the door in the second configuration; wherein the second support mechanism comprises a second guide mechanism, and the second guide mechanism comprises a guide track arranged to guide translation of the door as the door is translated along the second path.

2. The aircraft passenger accommodation unit of claim 1, wherein the first path is parallel to the second path.

3. The aircraft passenger accommodation unit of claim 1, wherein the first guide mechanism comprises a first guide track arranged to guide the translation of the door as the door is translated along the first path.

4. The aircraft passenger accommodation unit of claim 3, wherein the first guide track is provided on the shell.

5. The aircraft passenger accommodation unit of claim 1, wherein the first support mechanism comprises a release mechanism, moveable between a retaining position, in which the door is retainable in the first configuration, and a released position, in which the door is released from the first configuration.

6. The aircraft passenger accommodation unit of claim 5, wherein, when the release mechanism is in the released position, the door is translatable from the first configuration to the second configuration.

7. The aircraft passenger accommodation unit of claim 5, comprising a release handle, wherein actuation of the release handle is operable to cause the release mechanism to move from the retaining position to the released position.

8. The aircraft passenger accommodation unit of claim 7, wherein the release handle is connected to the release mechanism by a release cable.

9. The aircraft passenger accommodation unit of claim 1, wherein the second guide track is provided on the shell.

10. A door arrangement for an aircraft passenger accommodation unit, the door arrangement being for providing variable access through an opening of the aircraft passenger accommodation unit, wherein the door arrangement comprises:
a panel;
a door translatable with respect to the panel along a first path in a first direction across the opening between a closed position in which passenger egress between an aisle and a seat is partially blocked, and an open position which allows passenger access between the aisle and the seat through the opening,
wherein the door is translatable in a second direction that is transverse to the first direction, between a first, raised, configuration and a second, dropped, configuration,
wherein, when the door is in the first configuration, the door is translatable across the opening along the first path, and,
wherein, when the door is in the second configuration, the door is translatable across the opening along a second path, and wherein the first path and the second path are discrete paths;
wherein the door arrangement further comprises:
a first support mechanism, wherein the first support mechanism is arranged to support the door in the first configuration, wherein the first support mechanism comprises a first guide mechanism arranged to guide translation of the door along the first path; and
a second support mechanism, wherein the second support mechanism is arranged to support the door in the second configuration; wherein the second support mechanism comprises a second guide mechanism, and the second guide mechanism comprises a guide track arranged to guide translation of the door as the door is translated along the second path.

11. A method of using a door arrangement of an aircraft passenger accommodation unit, the door arrangement comprising:
a panel; and
a door translatable with respect to the panel along a first path in a first direction across an opening between a closed position in which passenger egress between an aisle and a seat is partially blocked, and an open position which allows passenger access between the aisle and the seat through the opening,
wherein the door is translatable in a second direction that is transverse to the first direction, between a first, raised, configuration and a second, dropped, configuration,
wherein, when the door is in the first configuration, the door is translatable across the opening along the first path, and,
wherein, when the door is in the second configuration, the door is translatable across the opening along a second path, and wherein the first path and the second path are discrete paths;
wherein the door arrangement further comprises:
a first support mechanism, wherein the first support mechanism is arranged to support the door in the first configuration, wherein the first support mechanism comprises a first guide mechanism arranged to guide translation of the door along the first path; and
a second support mechanism, wherein the second support mechanism is arranged to support the door in the second configuration; wherein the second support mechanism comprises a second guide mechanism, and the second guide mechanism comprises a guide track arranged to guide translation of the door as the door is translated along the second path, the method comprising the step of using the aircraft passenger accommodation unit or door arrangement.

12. The method of claim 11, further, comprising the steps of:
   (i) translating the door along the first path in the first direction across the opening;
   ii) translating the door in the second direction transverse to the first direction, from the first configuration to the second configuration; and
   iii) translating the door in the second configuration, across the opening, along a second path, to provide variable access through an opening between the aisle and the seat.

13. The method of claim 12, further comprising the step of:
   iv) translating the door in the second direction transverse to the first direction from the second configuration to the first configuration.

14. The method of claim 13, further comprising, prior to step (iv) performing the step of:
   v) moving a release mechanism from a retaining position to a released position.

* * * * *